(No Model.)

L. LUPPEN.
WHEEL.

No. 303,229. Patented Aug. 5, 1884.

Witnesses.
A. Ruppert,
Wm H Bates

Luppe Luppen
Inventor.
Holloway & Blanchard
Attys

UNITED STATES PATENT OFFICE.

LUPPE LUPPEN, OF PEKIN, ILLINOIS.

WHEEL.

SPECIFICATION forming part of Letters Patent No. 303,229, dated August 5, 1884.

Application filed October 18, 1882. (No model.)

*To all whom it may concern:*

Be it known that I, LUPPE LUPPEN, a citizen of the United States, residing at Pekin, in the county of Tazewell and State of Illinois, have invented certain new and useful Improvements in Wheels for Cultivators, of which the following is a specification, reference being had therein to the accompanying drawings.

My invention relates to improvements in wheels for cultivators, sulky-plows, or road-vehicles, and is of that class of wheels made of iron or steel or other suitable metal.

It consists in the novel combinations and arrangements of the several parts, as will be hereinafter more fully described.

My object in this invention is to produce a wheel of great strength and durability, simple, and of cheap construction.

Figure 1:
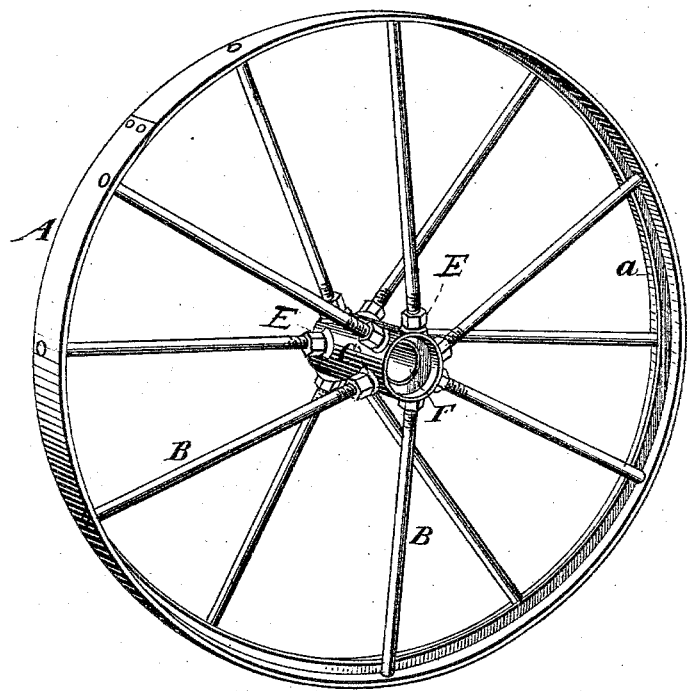
Figure 2:
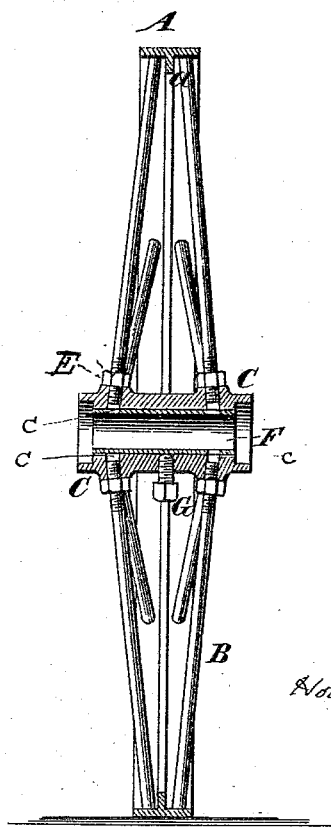

In the accompanying drawings, Figure 1 is a perspective view of the wheel, and Fig. 2 is a vertical sectional view of the same.

Similar letters refer to similar parts in both views.

A represents the tire of the wheel, which is provided with a flange, $a$, on its inner surface, which makes said tire or rim of the wheel T-shaped, or, in other words, is centrally thickened to leave thin edges. This increased thickness, while adding greatly to the strength, does not add very much to the weight. On each side of this flange $a$ is inserted, through holes made in the tire or rim in series, one series being out of the same plane with the other series, the outer ends of a suitable number of spokes, B, which are riveted or headed down flat on the tire and equidistant apart. These spokes are arranged alternately with each other at their outer ends against the opposite sides of said flange, and their other ends are provided with screw-threads, which are inserted in holes $c$, made in hub C, said holes being correspondingly screw-threaded. The spokes B are further provided with screw-threaded jam-nuts E, by means of which the spokes are tightened on the hub and prevented from giving way. The nuts are run down on the spokes before the spokes are fastened to the tire. The hub is strengthened by projections arranged annularly around the body and provided with inclined screw-threaded holes $c$ for the staggered spokes. Within the hub C, above described, is fitted a cylindrical box or sleeve, F, through which the axle passes, and abutting against this box is the end of a set-screw, G, by means of which the box or sleeve is held tightly in place when screwed up, and by unscrewing or loosening said set-screw the box can be taken entirely out and be replaced with another one whenever from any cause it is deemed necessary.

It will be seen from the above description that the wheel is composed entirely of metal, thus combining lightness and strength, as the several parts can be made much smaller.

I am aware that wheels have been provided with hubs having screw-threaded openings for the spokes, that jam-nuts have been used on spokes, and that screw-threaded nipples have been formed upon hubs, and these I do not claim.

Having thus described my invention, what I claim as new, and desire to secure by Letters Patent, is—

A wheel composed entirely of metal, consisting of a hub made in one piece, having projections arranged annularly around the body, forming nipples projecting beyond the diameter of the hub, and having inclined screw-threaded holes through them, the staggered spokes screwed into said nipples, the jam-nuts for the inner ends of the spokes, the rim centrally thickened to leave thin edges, and perforated, and the outer tenoned ends of the spokes passed entirely through the rim, shouldered and riveted, all constructed in the manner shown and described.

In testimony whereof I affix my signature in presence of two witnesses.

LUPPE LUPPEN.

Witnesses:
WM. HEMMINGHOUSE,
H. F. FRODEE.